United States Patent …

(12) United States Patent
Wright et al.

(10) Patent No.: US 8,504,636 B2
(45) Date of Patent: Aug. 6, 2013

(54) MONITORING COMMUNICATIONS USING A UNIFIED COMMUNICATIONS PROTOCOL

(75) Inventors: Kenneth W. Wright, Warrenton, VA (US); John S. Lear, Purcellville, VA (US); John E. Stem, Berryville, VA (US); Robert Bryan Harrover, Manassas, VA (US)

(73) Assignee: Raytheon Company, Waltham, MA (US)

(*) Notice: Subject to any disclaimer, the term of this patent is extended or adjusted under 35 U.S.C. 154(b) by 627 days.

(21) Appl. No.: 12/437,975

(22) Filed: May 8, 2009

(65) Prior Publication Data
US 2010/0287222 A1 Nov. 11, 2010

(51) Int. Cl.
G06F 15/16 (2006.01)
(52) U.S. Cl.
USPC ........... 709/207; 709/203; 707/803; 707/812; 707/919; 707/955
(58) Field of Classification Search
None
See application file for complete search history.

(56) References Cited

U.S. PATENT DOCUMENTS

| 2003/0005107 | A1 | 1/2003 | Dulberg et al. |
| 2003/0142851 | A1 | 7/2003 | Brueckner et al. |
| 2005/0086255 | A1* | 4/2005 | Schran et al. ................. 707/102 |
| 2007/0100952 | A1* | 5/2007 | Chen et al. .................... 709/207 |
| 2008/0307488 | A1 | 12/2008 | Hammond, II et al. |
| 2010/0064039 | A9* | 3/2010 | Ginter et al. .................. 709/224 |
| 2010/0153175 | A1* | 6/2010 | Pearson et al. ................. 705/10 |

OTHER PUBLICATIONS

European Patent Office, "Communication," Application No. 10162213.2-2416, Jul. 6, 2010, 4 pages.

* cited by examiner

Primary Examiner — Liangche A Wang
Assistant Examiner — Suraj Joshi
(74) Attorney, Agent, or Firm — Cantor Colburn LLP

(57) ABSTRACT

According to particular embodiments, a communications monitoring system includes agent servers that deploy automated agents into various group communications services and a central server that receives the event data collected by the automated agents using the unified communications protocol. The central server also transmits the event data and any alerts that were determined from the event data to operator interfaces according to operator profiles.

23 Claims, 3 Drawing Sheets

MONITORING COMMUNICATIONS USING A UNIFIED COMMUNICATIONS PROTOCOL

TECHNICAL FIELD

This disclosure relates generally to communications systems and, more particularly, to communications systems and methods for monitoring communications using a unified communications protocol.

BACKGROUND

People often use the Internet as a means for social interaction (through email, instant messaging, chat rooms, electronic message boards, etc.). They may subscribe to chat services that are provided by chat service providers. In addition, services such as match.com, trading marketplaces such as eBay, and online recruiting sites such as monster.com may incorporate chat services into their business models. As people increasingly exchange communications over the Internet, they expose a wealth of information about themselves.

SUMMARY

According to particular embodiments, a system for monitoring communications includes a database storing operator profiles, user profiles, sets of monitoring instructions, and triggers, one or more agent servers, and a central server. Each of the agent servers deploys automated agents, and each of the automated agents receives a set of monitoring instructions and a user profile, registers the user profile with a communications service identified by the monitoring instructions, and collects event data from the communications service in a native communications protocol of the communications service. The agent servers also translate the event data from the native communications protocol to a unified communications protocol. The central server receives, using the unified communications protocol, the event data collected by each of the automated agents, stores the received event data in the database, determines the triggers satisfied by the received event data, generates alerts resulting from the satisfied triggers, and, for each of the operator interfaces, determines one or more communications services assigned to the operator interfaces according to the operator profiles, determines event data and alerts for the assigned communications services, and transmits the event data and the alerts to the operator interface.

Certain embodiments may provide one or more technical advantages. A technical advantage of one embodiment may be the ability to provide data from multiple communications services to a single operator interface for each one of multiple operators. The operator interface enables one person to easily monitor many communications streams at one time. For example, embodiments may support real-time or near real-time monitoring of multiple text-based communications services (such as a Yahoo! chatroom and an AOL chatroom) using a unified interface, even for communications services operating in different protocols. In addition, the unified interface may be equipped with automated capabilities, such as automated responses, and settings regarding whether a particular monitoring agent is visible or not to one, some or all users within a particular communications service. Another technical advantage of one embodiment may be the ability to administer a communications monitoring system with automated capabilities for multiple operators and multiple communications services that is protocol independent and expandable to include any communications protocol.

Other technical advantages of the present disclosure may be readily apparent to one skilled in the art from the following figures, descriptions, and claims. While specific advantages have been enumerated above, various embodiments may include all, some, or none of the enumerated advantages.

BRIEF DESCRIPTION OF THE DRAWINGS

For a more complete understanding of embodiments of the present disclosure and its advantages, reference is made to the following description, taken in conjunction with the accompanying drawings, in which.

DETAILED DESCRIPTION OF EXAMPLE EMBODIMENTS

In accordance with the teachings of the present disclosure, a method and system are provided that support monitoring of multiple communications services using multiple protocols. In general, the method and system for monitoring communications services deploys an automated agent into each one of multiple communications services to collect data, processes the data using a central server, generates alerts associated with the data, and distributes data collected from one or more of the communications services and associated alerts to an operator for viewing.

Figure 1:
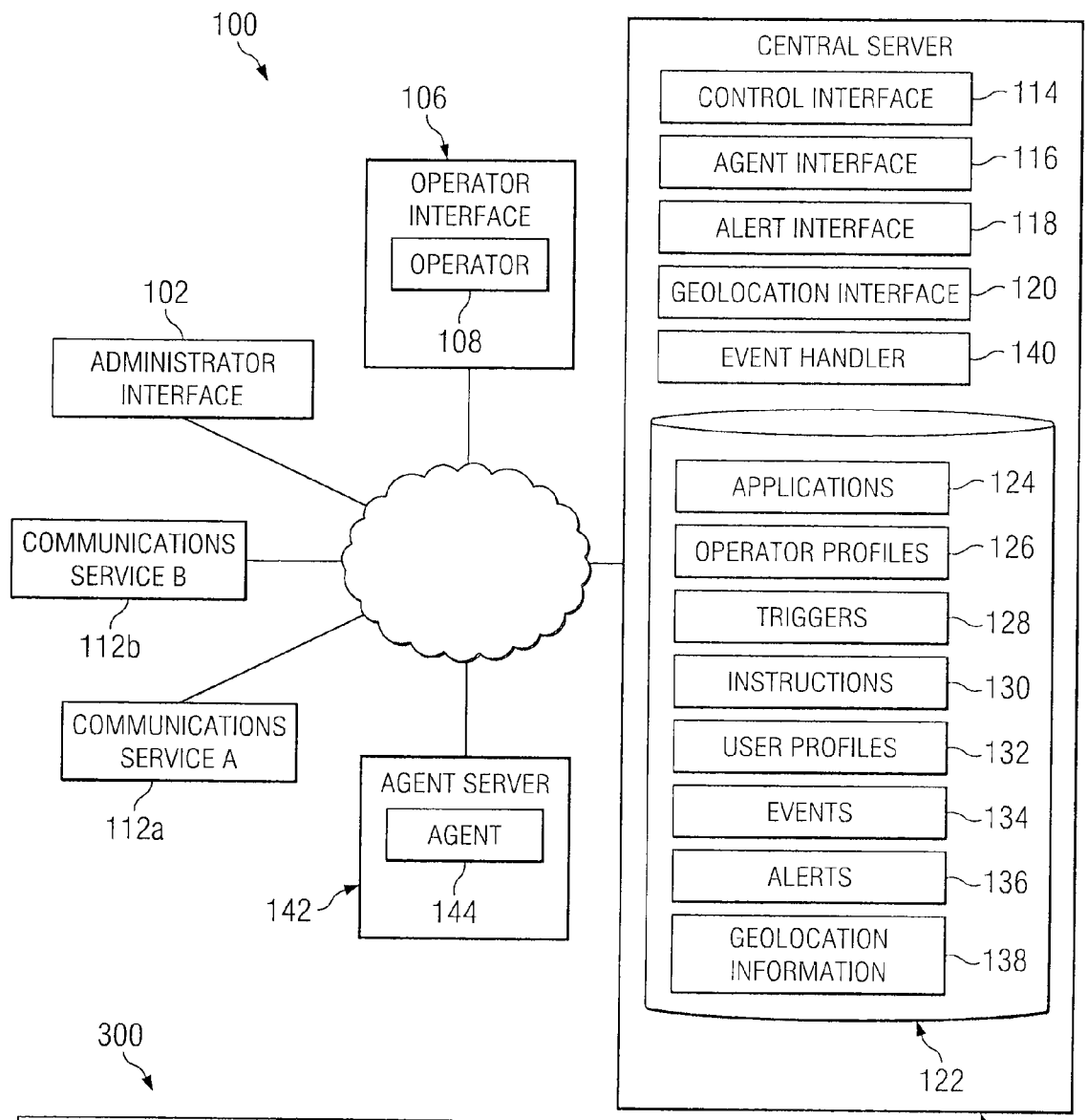
FIG. 1 illustrates example portions of a system for monitoring communications in accordance with various embodiments of the present disclosure.

FIG. 1 illustrates a portion of a system 100 for monitoring communications. As illustrated, system 100 includes communications services 112, operator interface 106, operator 108, administrator interface 102, central server 110, agent server 142, and agent 144. In operation, system 100 allows operators 108 to monitor multiple communications services 112 using multiple agents 144 by processing data collected by the agents 144 within central server 110, generating alerts 136 associated with the data, and distributing the data and associated alerts 136 to operators 108 for viewing.

Communications services 112 include chat rooms, online messaging services, and any other service for communications between users registered to communicate with other users through that service using a particular communications protocol. The present disclosure is not limited to particular communications services such as chat room services or instant messaging services. A user represents a person whose communications using communications services 112 are subject to being monitored. Exemplary communications protocols for communications services 112 include Internet Relay Chat ("IRC"), OSCAR protocol, Microsoft Notification Protocol (MSNP), Internet Relay Chat (IRC), rendezvous protocol, Yahoo! Messenger Protocol, and Extensible Messaging and Presence Protocol ("XMPP"). When a user registers to communicate with other users through a particular communications service 112, users acquire a user name and/or other identification information that may be used to identify the user with the communications that it inputs into the communications service 112. A user profile 132 contains some or all identification information associated with a particular user. For example, user profile 132 may include a user name and password for a particular service.

Administrator interface 102 represents hardware and/or appropriate controlling software for setting up operator interfaces 106 to monitor one or more communications services 112 within system 100. Administrator interlace 102 receives instructions 130 regarding particular communications services 112 to be monitored and transmits those instructions 130 to central server 110. In operation, administrator interface 102 assigns one or more communications services 112 to each one of multiple operator interfaces 106 and sets up the operator interfaces 106 for operators 108 to monitor one or more communications services 112 within system 100. Administrator interface 102 provides a separate window, tab or other graphical container for each communications service 112 that is assigned to a particular operator interface 106.

In some embodiments, operators 108 represent hardware and/or appropriate controlling software. In other embodiments, operators 108 refer to the person or persons attempting to monitor and/or transmit communications using operator interfaces 106 by any method or means. Operators 108 monitor, submit and receive communications within communications services 112 through operator interfaces 106. Operators 108 also enter triggers 128 into operator interfaces 106 to be sent to central server 110. For example, operator 108 may request to be alerted if any user's communications in communications service 112a mentions "Iraq" or request to automatically respond "hello" when a user enters communications service 112b or respond "I am not interested in meeting in person" when a user asks to "meet in person." In addition, operators 108 may input requests into operator interfaces 106 to be sent to central server 110. For example, operator 108 may request the last ten seconds of data from communications service 112a, the latest alerts 136 from communications service 112a, and/or a list of users currently active within communications service 112a. In particular embodiments, operators 108 may request to be hidden from one, some, or all users when monitoring a particular communications service, such as communications service 112a. Although operator 108 is shown as part of operator interface 106, operator 108 may be logically or physically separated from operator interface 106.

Operator interfaces 106 represent hardware and/or appropriate controlling software for displaying data collected from one or more of the communications services 112 within system 100. Operator interfaces 106 are situated to receive from central server 110 and display to operators 108 the data collected and events 134, alerts 136, and geolocation information 138 associated with the data collected. Operator interfaces 106 may display data within any number, type, and/or arrangement of tabs, windows, and other display components using any graphics, display templates, and/or other suitable display software that may be used with a web browser. For example, operator interfaces 106 may run software for mapping geolocation information 138 onto a map for display to operators 108. According to particular embodiments, operator interfaces 106 interact with central server 110 using web-based protocols, such as hypertext transfer protocol (HTTP) or secure HTTP (HTTPS). Operator interfaces 106 are described in more detail below with regard to FIG. 2.

Central server 110 may be any one of a variety of hardware and software components that function to centrally store and process data collected from one or more communications services 112 and to transmit selected stored and processed data to operator interfaces 106. Central server 110 is situated to receive instructions 130 regarding particular communications services 112 to be monitored from administrator interface 102 and to couple agent servers 142 to operator interfaces 106 to populate the operator interfaces 106 with data from one or more of the communications services 112 for monitoring. As illustrated, central server 110 includes a control interface 114, an agent interface 116, an alert interface 118, a geolocation information interface 120, a database 122, and an event handler 140. While a particular embodiment is illustrated, however, central server 110 may comprise any number and/or type of interface components. For example, central server 110 may include only a single control interface rather than multiple control interfaces. Although only central server 110 and agent servers 142 are illustrated, any number and/or type of servers may be coupled to system 100.

Database 122 may include any number of computer hardware elements or software elements to function as a memory for system 100. Database 122 includes applications 124, operator profiles 126, triggers 128, instructions 130, user profiles 132, events 134, alerts 136, geolocation information 138, and other information as may be necessary according to various implementations of the present example. As illustrated, database 122 may be compartmentalized into different holding places according to particular categories. However, information may be stored in database 122 without regard to categorical distinctions.

Applications 124 are logic encoded in media, such as software and/or programmed logic devices capable of execution when loaded into processing devices, to support monitoring of multiple communications services using multiple protocols. Central server 110 uses applications 124 to monitor multiple communications services using multiple protocols. For example, an application 124 may be an algorithm to search events 124 for keyword triggers 128. Another exemplary application 124 may be an algorithm for mapping event queues and alert queues to the appropriate operator interfaces 106.

An operator profile 126 for a particular operator interface 106 includes the one or more communications services 112 assigned to that operator interface 106. Administrator interface 102 creates an operator profile 126 for a particular operator interface 106 by assigning one or more communications services 112 to that operator interface 106 for monitoring. Operator profiles 126 are used by central server 110 to transmit to operator interfaces 106 only those event queues and alert queues that are associated with the communications services 112 assigned to the operator interfaces 106.

Instructions 130 identify the particular communications services 112 for system 100 to monitor. Administrator interface 102 receives instructions 130 from a human administrator and/or other entity capable of entering or otherwise communicating instructions 130 to administrator interface, such as, for example, software and/or hardware such as networking equipment and/or servers. Administrator interface 102 transmits instructions 130 to central server 110, and central server 110 receives instructions 130 and transmits instructions 130 to agent server 142, which forwards and/or modifies and sends all or part of instructions 130 to agents 144. Agent server 142 may divide instructions 130 into sets of instructions 130 and send a selected set of instructions 130 to each of multiple agents 144, as each agent 144 may monitor only one communication service 112 at a time. In particular embodiments, central server 110 stores instructions 130 in database 122.

A user profile 132 identifies a user with a communications service 112 and may include a user's user name and password for a particular service. When a user registers to communicate with other users through a particular communications service 112, users acquire a user name, password, and/or other identification information that may be used to identify the user with the communications that the user inputs into the communications service 112.

Triggers 128 are instructions to generate alerts 136, instructions to automatically respond to particular communications of one or more users, or any other instructions from operator 108 with regard to monitoring, responding to, and/or processing particular occurrences within communications services 112, such as keywords exchanged, communications behaviors of users, or geolocation information. For example, a particular trigger 128 may specify any text mentioning "Iraq." As another example, a particular trigger 128 may specify an automated response to particular text and/or geolocation information. As a further example, a particular trigger 128 may specify a test or series of tests for one or more users' locations or whether any users of one or more communications services 112 match a particular location. Operators 108 input triggers 128 into operator interfaces 106 for one or more communications services 112, central server 110 receives triggers 128 from operator interfaces 106 and transmits triggers 128 to agent server 142, and agent server 142 applies triggers 128. According to particular embodiments, central server 110 may apply certain types of triggers 128 instead of or in addition to agent server 142.

An alert 136 is an indication that a trigger 128 has been satisfied. For example, if a trigger 128 specifies any text mentioning "Iraq," an alert 136 associated with that trigger 128 would indicate that a user communicated the text "Iraq" in a communications service 112. Agent server 142 generates alerts 136 by applying triggers 128 to data collected from one or more communications services 112 and transmits alerts 136 to event handler 140 of central server 111. Event handler 140 stores alerts 136 in database 122. Alert interface 118 monitors database 122 for alerts 136, queues alerts 136 for particular communications services 112, and transmits the alert queue for each communications service 112 to the one or more operator interfaces 106 to which the associated communications services 112 were assigned and into which the associated trigger 128 was input. Operator interfaces 106 display alerts 136 to operators 108 using any one or more display methods such as, for example, displaying a pop-up window or tab, flashing a window or tab in which all events 134, including alerts 136, are displayed, and generating an alert sound.

Events 134 represent data collected from communications services 112, such as text messages communicated by users and any other user inputs collected by agents 144 from communications services 112, including automated responses and any other inputs from agents 144. Events 134 include the name of the user responsible for the event 134 and timing information associated with user inputs, such as, for example, the calendar date and time, the total typing time, any information regarding the amount of time it took the user to input all or one or more parts of the input, and/or any information regarding the user's computer activity. Events 134 further include acknowledgements of users entering and exiting, communications services 112, user names of users that are active and/or registered with communications services 112, and user entrances into and exits out of communications services 112. Agent server 142 collects events 134 from agents 144, applies triggers 128 to events 134, and transmits events 134 to event handler 140 of central server 110 for further processing. Event handler 140 associates events 134 received from agent servers 142 with the particular agents 144 that collected events 134 and thus with the particular communications services 112 from which events 134 were collected. Event handler 140 of central server 110 stores events 134 in database 122, queues events 134 for particular communications services 112, and transmits the event queue for each communications service 112 to the one or more operator interfaces 106 to which the associated communications services 112 were assigned.

Geolocation information 138 is the identification of the geographic location or other location information of a user of a communications service 112. Agents 144 collect this information about active users of communications services 112, whether the users are connected to the communications service 112 via an Internet-connected computer, mobile device, website visitor or other. Agent server 142 collects geolocation information 138 from agents 144 and transmits geolocation information 138 to geolocation information interface 120 of central server 110 for further processing and delivery to operator interfaces 106. Event handler 140 stores geolocation information 138 in database 122. Geolocation information interface 120 monitors database 122 for geolocation information 138, queues geolocation information 138 for particular communications services 112, and transmits the geolocation information queues for each communications service 112 to the one or more operator interfaces 106 to which the associated communications services 112 were assigned.

In operation, central server 110 receives instructions 130 regarding communications services 112 to be monitored from administrator interface 102 and routes the received instructions 130 to agent server 142 using a web protocol, such as an HTTP protocol. Central server 110 receives triggers 128 and user profiles 132 from operator interface 106 and routes them to agent server 142 using a web protocol, such as an HTTP protocol. Central server 110 receives events 134 from agent servers 142 and generates event queues, alert queues, and geolocation information queues for each one of multiple communications services 112. According to particular embodiments, central server 110 receives events 134 from agent servers 142 in Extensible Markup Language (XML). In other embodiments, central server 110 receives events 134 from agent servers 142 in HTTP format. Central server 110 determines the one or more communications services 112 assigned to each of multiple operator interfaces 106 according to operator profiles 126 and transmits the event queues, alert queues, and geolocation information queues to the appropriate operator interface 106. Central server 110 also receives and handles requests from operator interface 106 regarding retrieval of particular subsets of events 134, alerts 136, and geolocation information 138. In particular embodiments, event handler 140 of central server 110 may apply triggers 128 to events 134 and generate corresponding alerts 136.

Control interface 114 receives operator profiles 126 from administrator interfaces 102, requests from operator interface 106 regarding retrieval of particular subsets of events 134, alerts 136, and geolocation information 138, and triggers 128 from operators 108. Control interface 114 maps responses to requests from operator interface 106 to the appropriate operator interfaces 106 based on the requests from operator interface 106. Control interface 114 maps the responsive event queues, responsive alert queues, and responsive geolocation information queues to the appropriate operator interfaces 106 based on the operator profiles 126.

Agent interface 116 receives communications services 112 to be monitored and user profiles 132 and dispatches those communications services 112 and user profiles 132 to agents 144 through agent servers 142. Agent interface 116 is operable to load balance multiple agent servers 142 by dispatching those communications services 112 and user profiles 132 to one or more agent servers 142.

Alert interface 118 monitors database 122 for alerts 136. Optionally, alert interface 118 may also generate alerts 136 by monitoring database 122 for triggers 128 and events 134 and applying triggers 128 to events 134. In particular embodiments, alert interface 118 queues alerts 136 in the order in which the associated events occurred or in any other logical arrangement. Alert interface 118 may also queue alerts 136 in a separate queue for each trigger 128. According to particular embodiments, based on the control interface 114, alert interface 118 sends alerts 136 to the appropriate window within operator interface 106 for each operator 108. For example, if an operator 108 requests the last ten seconds of alerts 136 from communications service 112a, alert interface 118 will respond to the request by transmitting that portion of its alert queue to operator interface 106.

Geolocation information interface 120 monitors database 122 for geolocation information 138. Geolocation event interface 120 may queue geolocation information 138 in the order in which the associated events occurred or in any other logical arrangement. According to particular embodiments, based on the control interface 114, geolocation information interface 120 sends events to the appropriate window or location within operator interface 106 for each operator 108. For example, if an operator 108 requests the last ten seconds of geolocation information 138 from communications service 112a, geolocation information interface 120 will respond to the request by transmitting that portion of its geolocation information queue to operator interface 106.

Event handler 140 receives events 134 from agent server 142, stores events 134 received into database 122, and communicates events 134 to operator interface 106 for each operator 108. In some embodiments, event handler 140 may parse events into categories such as alert events 136 and geolocation information 138 according to the type of information depicted by a particular event 134. In other embodiments, event handler 140 may store events 134 in database 122 without first separating events 134 into alert events 136 and geolocation information 138. In particular embodiments, event handler 140 receives events 134 through an HTTP connection. In particular embodiments, event handler 140 may apply one or more triggers 128 to events 134. For example, event handler 140 may search received events 134 for text that matches a keyword-type trigger 128 and generate a corresponding alert 136, and store the alert 136 in database 122. It may be advantageous for both agent server 142 and event handler 140 to be operable to apply the same or different triggers 128 to events 134 in the exemplary instance in which agent server 142 applies one or more triggers 128 as events 134 are received and event handler 140 applies one or more triggers 128 after events 134 have been received and stored in database 122 in response to requests from operators 108 to search events 134 stored in database 122.

Agent server 142 provides each of multiple agents 144 with the user profile 132 necessary to register the agent 144 with a communications service 112, dispatches one or more agents 144 into one or more communications services 112, receives events 134 from each of its dispatched agents 144 in the communications protocol in which the event was collected, and transmits those events 134 to event handler 140 of central server 110. In particular embodiments, agent server 142 associates events 134 received with the agent 144 that collected the event 134, queues events 134 for each agent, and transmits the event queues to event handler 140. In particular embodiments, agent server 142 may send events 134 to event handler 140 in the format in which the events were received, that is, in the format of the communications service 112. Alternatively, agent server 142 translates events 134 into a unified communications protocol used by central server 111. As an example, agent servers 142 may translate received events into an XML-based unified communications protocol. This enables central server 110 to monitor any number and type of communications services 112, with agent servers 142 providing monitoring and translating. Central server 110 may employ any number of agent servers 142 to deploy the needed number of agents 144. For example, if one agent server 142 can deploy a maximum of one hundred agents and central server 110 receives requests for monitoring two hundred communications services 112, then central server 110 may employ at least two agent servers 142 to accommodate the request.

Agents 144 are assigned by agent servers 142 to monitor events 134 within a particular communications service. Each of the automated agents 144 receives a user profile 132 from agent server 142, registers with a communications service 112 using the user profile 132, and monitors the communications service 112 in a native communications protocol of the communications service 12 for events 134. In particular embodiments, agent 144 may apply triggers 128 to events 134 to generate alerts 136 and geolocation information 138.

A component described in FIG. 1 may include an interface, logic, memory, and/or other suitable element.

An interface represents hardware and/or appropriate controlling software. An interface receives input, sends output, processes the input and/or output, and/or performs other suitable operations.

Logic represents software and/or programmed logic devices capable of execution when loaded onto processing devices. Processing devices include one or more computers, one or more microprocessors, one or more applications, and/or other logic. When executed, logic performs the operations of a component or manages the operations of a component, such as, for example, generating output from input. A computer-readable medium encoding logic performs and/or manages operations when loaded onto processing devices and executed.

A memory stores information. A memory may comprise one or more tangible, computer-readable, and/or computer-executable storage media. Examples of a memory include computer memory (for example, Random Access Memory (RAM) or Read Only Memory (ROM)), mass storage media (for example, a hard disk), removable storage media (for example, a Compact Disk (CD) or a Digital Video Disk (DVD)), network storage (for example, a server), and/or other computer-readable medium.

The above description provides an example of a system for monitoring communications. The example explains particular embodiments and is not all-inclusive. Although system 10 depicts a particular logical configuration of components, system 10 may include any appropriate logical and physical combination, separation, or distribution of the components and their functionality. In addition, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program. As used in this document, "each" refers to every individual member of a set or every individual member of a subset of a set.

Figure 3:
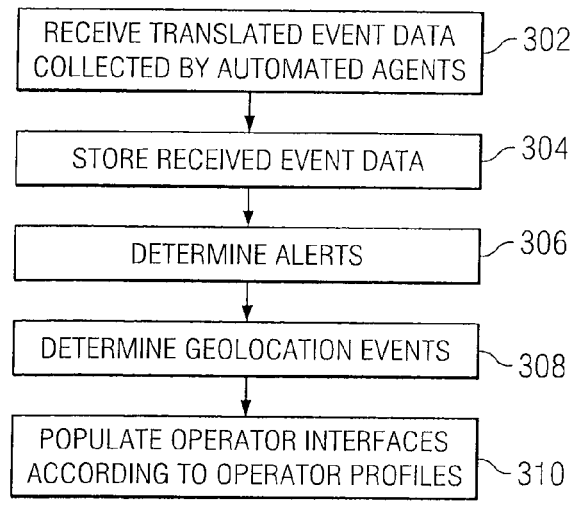
FIG. 3 is a flowchart that illustrates a method for monitoring communications using the example system of FIG. 1.

FIGS. 2 and 3 illustrate additional details of example embodiments shown in FIG. 1. The description below referring to FIG. 2 describes an example operator interface presenting selected information from the example system 100 of FIG. 1. The description below referring to FIG. 3 further describes an example method for monitoring multiple communications services using multiple protocols.

Figure 2A:
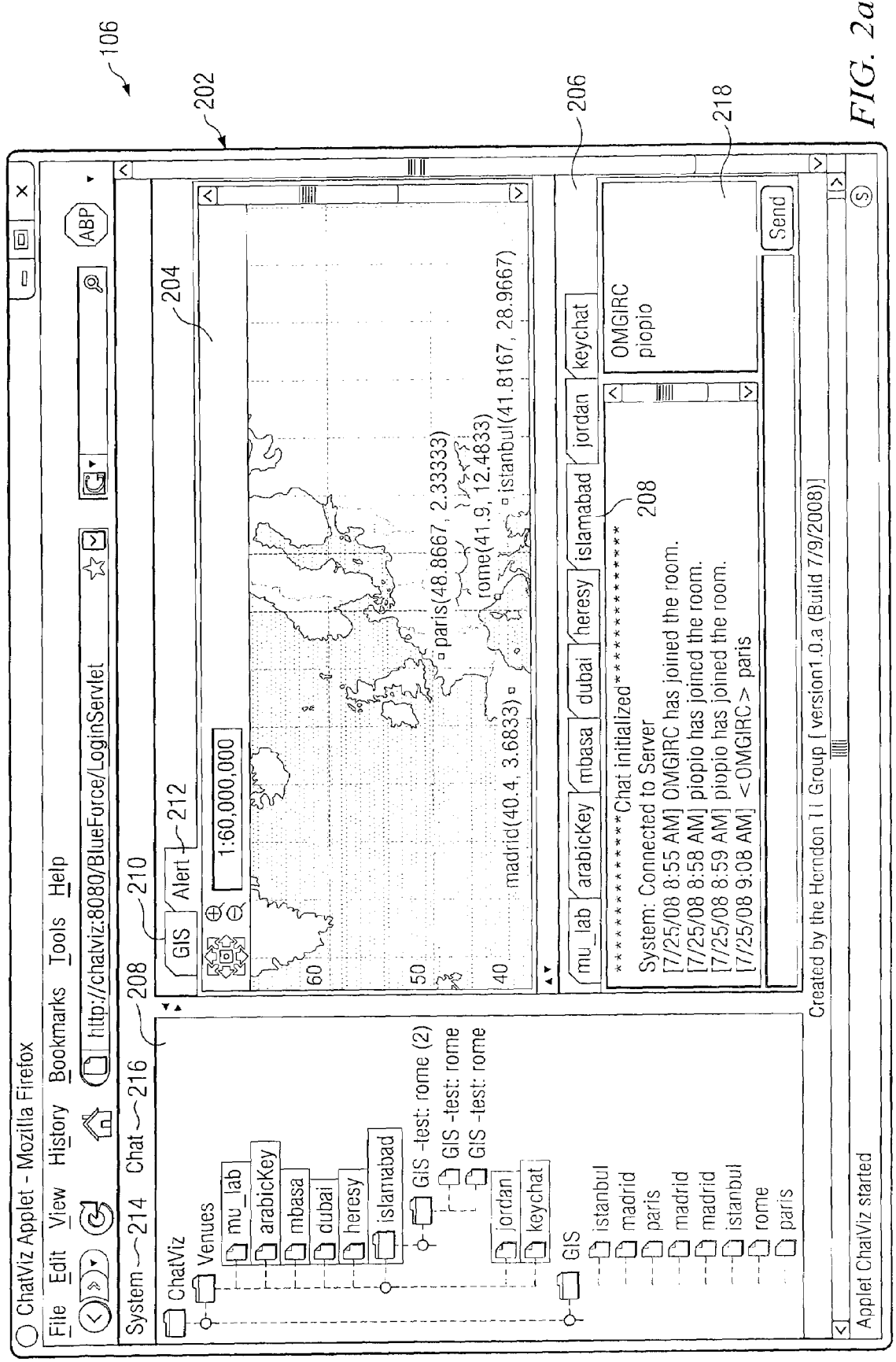
FIGS. 2A and 2B illustrate an example operator interface presenting information collected by the example system of FIG. 1.
Figure 2B:
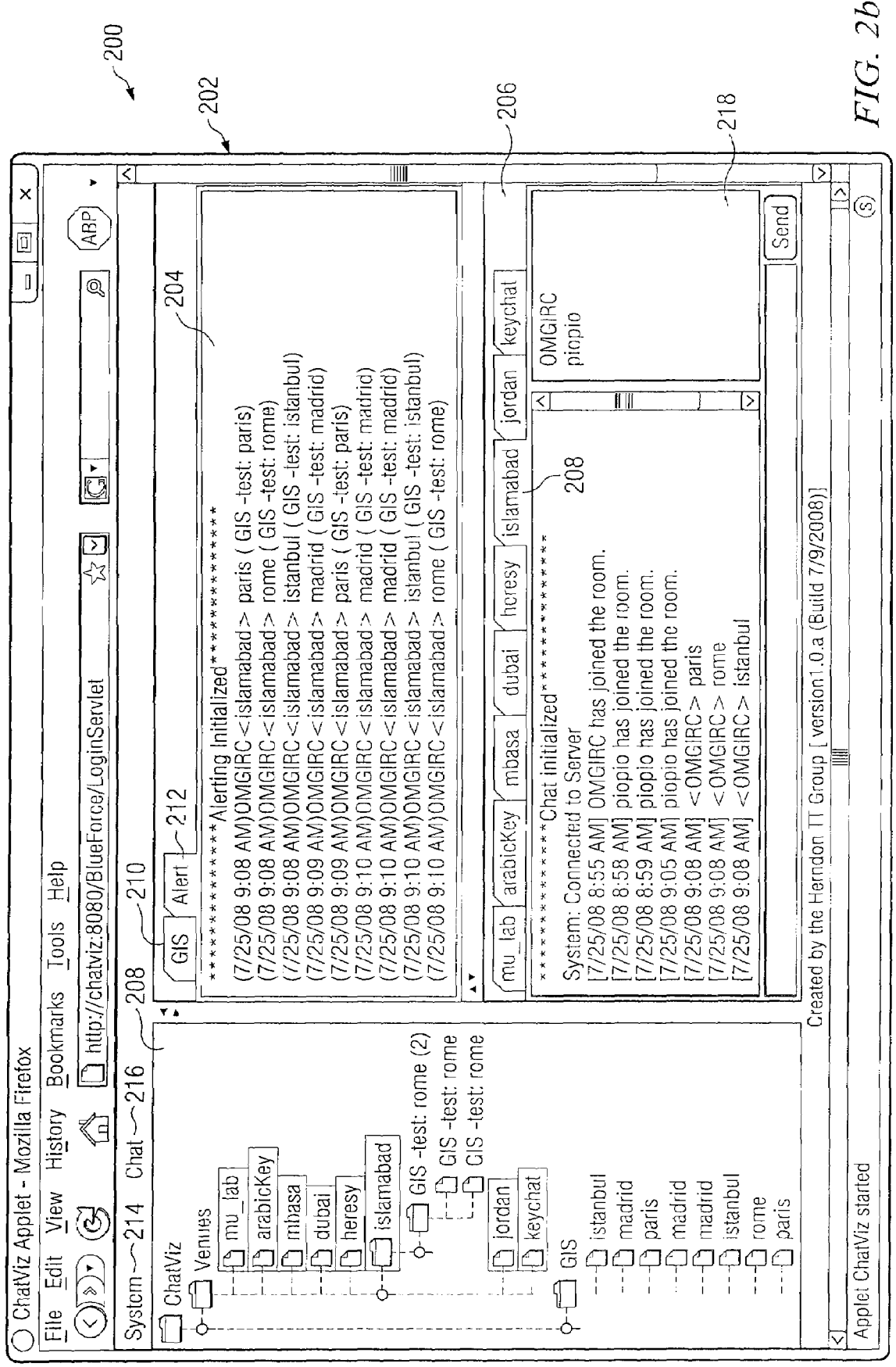

FIGS. 2A and 2B illustrate an example operator interface, indicated generally at 106, for presenting selected information from the example system 100 of FIG. 1. FIG. 2A illustrates a tabbed view of operator interface 106 in which the geolocation information 138 display tab "GIS" 210 is activated for viewing. FIG. 2B illustrates a tabbed view of operator interface 106 in which the alerts 136 display tab "Alert" 212 is activated for viewing. FIGS. 2A and 2B include browser window 202, upper tab display area 204, lower tab display area 206, and tree directory 208. Operator interface 106 displays those one or more communications services 112 that are assigned by administrator interface 102 to the operator 108 for monitoring, including events 134, alerts 136, and geolocation information 138 from the assigned communications services 112. Operator interface 106 may display events 134, alerts 136, and geolocation information 138 on a real-time or near real-time basis and/or any other events 134, alerts 136, and/or geolocation information 138 that the operator 108 may request and that the operator interface 106 may receive from database 122 of central server 110 through the various components and operations of central server 110 discussed above with respect to FIG. 1.

Browser window 202 generally refers to any suitable display template produced by a browser application to display a web page. As illustrated, browser window 202 displays the web page at which an operator 108 may monitor events 134, alerts 136, and geolocation information 138 for each assigned communication service 112, referred to herein as the "main" page for a particular operator 108. Although not illustrated, operator 108 may scroll up and down within tabs and/or windows to view particular events 134, alerts 136, and geolocation information 138 retrieved by the operator interface 106. Operator 108 may also request other events 134, alerts 136, and/or geolocation information 138 that have or have not been previously retrieved by the operator interface 106, and browser window 202 may display the results of these requests. According to particular embodiments, browser window 202 displays the web address for the currently displayed one of multiple web pages associated with system 100. Browser window 202 may also display viewing options, system preferences, links to other web pages, and any other displays, options or links, including, but not limited to options associated with system 100 or advertisers of system 100.

As illustrated in browser window 202, "System" 214, if selected, displays a drop down menu that offers the operator 108 multiple viewing options. For example, a "Tab" view, if selected, displays a separate tab for each assigned communications service 112 (as illustrated by FIGS. 2A-2B) and a "Window" view, if selected, displays a separate window for each assigned communications service 112 (not illustrated). To change the view from a tabbed view to a windowed view, operator 108 may select the System 214 drop down menu and choose the "Window" menu item.

As illustrated in browser window 202, "Chat" 216, if selected, displays a drop down menu that offers the operator 108 multiple system preferences. For example, a "Manage Alerts" menu item, if selected, provides a pop-up window in which the operator 108 may create a new alert, edit an existing alert, or delete an alert by pressing the corresponding button. To create a new Alert, operator 108 may select the Chat 216 drop down menu, choose the "Manage Alerts" menu item, and type in, for example, a keyword-type trigger 128 "Iraq" and a trigger name "Keyword search for Iraq."

In the particular embodiment illustrated by browser window 202 of FIGS. 2A and 2B, the main page includes an upper tab display area 204, lower tab display area 206, and tree directory 208. Upper tab display area 204 provides a choice for viewing GIS tab 210 or Alerts tab 212. GIS tab 210 (FIG. 2A) illustrates an example map of geolocation information 138 for the assigned communications services 112. The operator 108 may navigate the map by clicking and dragging the map in desired directions and may zoom in and out to display the map in desired display resolutions. An example alert 136 shown within Alerts tab 212 (FIG. 2B) displays the date, time, user that triggered the alert 136, the assigned communications service 112 where the alert 136 occurred, the trigger 128 associated with the alert 136, and the trigger name for the associated trigger 128. All of this is extremely useful when trying to track when and where an alert 136 occurred.

Lower tab display area 206 displays all events 134, alerts 136, and geolocation information 138 by communications service 112, either one assigned communications service 112 at a time in a tabbed view (as illustrated) or one or more assigned communications services 112 at a time in a windowed view (not illustrated). Lower tab display area 206 displays events 134, alerts 136, and geolocation information 138 in chronological order, including any system generated events 134, such as automated responses. Lower tab display area 206 displays a separate window, tab or other graphical container for each assigned communications service 112. In the particular illustrated embodiment, lower tab display area 206 displays a list of active users 218 that are associated with a particular assigned communications service 112 when the tab or window for that assigned communications service 112 in lower tab display area 206 is highlighted. For example, the list of active users 218 illustrated by FIGS. 2A and 2B lists the active users in the Islamabad communications service 112, and the Islamabad tab 216 is activated. An example event 134 shown within Islamabad tab 208 displays the date, time, user responsible for the event 134, and the event 134. An example occurrence of an alert 136 or geolocation information 138 shown within the Islamabad tab 208 displays the date, time, user responsible for the alert 136 or geolocation information 138, and the trigger 128 or geolocation information 138. All of this is extremely useful for monitoring assigned communications services 112.

Tree directory 208 generally displays a directory of tabs and/or windows that may be shown in upper tab display area 204 and lower tab display area 206. Tree directory 208 includes an expandable entry named "Venues," vehicle includes expandable entries for the assigned communications services 112, expandable entries for the triggers 128 for each assigned communications service 112, and expandable entries for the geolocation information 128 for each assigned communications service 112. Tree directory 208 also includes an expandable entry named "GIS," which includes entries for each of the mapped user locations on the map shown within GIS tab 212.

In addition to the main page displaying events 134, alerts 136, and geolocation information 138 for each communication service 112 (illustrated by FIGS. 2A and 2B), browser window 202 may also display other web pages associated with system 100 and links for operator 108 to switch between the associated web pages. For example, browser window 202 may provide a home page for an operator 108 to login to the main page to monitor the assigned communications services 112. Browser window 202 may also provide links to web pages associated with system 100, such as links to instructions manuals and/or web pages that are not associated with system 100, such as advertising links.

The description of FIGS. 2A and 2B provides an example of an operator interface 106. The example explains particular embodiments and is not all-inclusive. Elements of system 100 may communicate with operator interfaces 106 having any appropriate format, display, contents, and functionalities.

FIG. 3 is a flowchart illustrating a method, indicated generally at 300, for monitoring multiple communications services using multiple protocols in accordance with various embodiments of the present disclosure. As illustrated, method 300 shows the steps involved for central server 110 to receive translated event data (events 134) from agent server 142 using a unified communications protocol, generate event queues, alert queues, and geolocation information queues for each one of multiple operator interfaces 106, and transmit the appropriate queues to the appropriate locations within the appropriate operator interfaces 106 according to their operator profiles 126.

According to particular embodiments, in step 302, event handler 140 of central server 110 receives events 134 collected by automated agents 144 from agent server 142. In particular embodiments, event handler 140 receives events 134 through an HTTP connection. Step 302 may include associating events 134 received from agent servers 142 with the particular communications services 112 from which the events were collected by a particular agent 144. In step 304, event handler 140 stores received events 134 in database 122. In particular embodiments, events 134 may be stored categorically as events 134 and/or alerts 136 and/or geolocation information 138. Alternatively, events 134 may be stored without regard for categorical distinctions.

In step 306, alert interface 118 monitors database 122 for events 134 that satisfy triggers 128, generates alerts 136 for events 134 that satisfy triggers 128, and queues alerts 136 in a logical order. Step 306 may include processing events 134 to apply triggers (for example, event handler 140 may search received events 134 for text that matches a keyword-type trigger 128) or otherwise examining and responding to incoming events 134. As another example, event handler 140 may search received events 134 for text and/or geolocation information 138 that matches an instruction to generate an automated response. As a further example, event handler 140 may test geolocation information 138 for one or more users' locations or for whether any users of one or more communications services 112 match a particular location. In step 308, geolocation information interface 120 monitors database 122 for geolocation information 138 and queues geolocation information 138 in a logical order.

In step 310, operator interfaces 106 receive from central server 110 and display to operators 108 data collected from one or more of the communications services and associated events 134, alerts 136, and geolocation information 138. In particular embodiments, central server 110 determines one or more communications services 112 assigned to each operator interface 106 according to operator profiles 126. In particular embodiments, method 300 may include generating alerts 136 based on triggers 128 satisfied by the events and transmitting the generated alerts 136 to the appropriate operator interface 106. In particular embodiments, central server 110 may queue the alerts 136 generated by one or more agent servers 142 and/or by central server 110.

In addition, in step 310, control interface 114 maps the responsive event 134 queues, responsive alert 136 queues, and responsive geolocation information 138 queues to the appropriate operator interfaces 106 based on the operator profiles 126. Control interface 114 ensures that the appropriate events 134 are sent from event handler 140 to the appropriate window or location within operator interlace 116 for each operator 108. Control interface 114 ensures that the appropriate alerts 136 are sent from alert interface 118 to the appropriate window within operator interface 106 for each operator 108. Control interface 114 ensures that the appropriate geolocation information 138 is sent from geolocation information interface 120 to the appropriate window or location within operator interface 106 for each operator 108.

The method described with respect to FIG. 3 is merely illustrative. The manner of operation and devices indicated as performing the operations may be modified in any appropriate manner. While the method describes particular steps performed in a specific order, system 100 contemplates any suitable collection and arrangement of elements performing some, all, or none of these steps in any operable order.

Particular examples specified throughout this document are intended for example purposes only and are not intended to limit the scope of the present disclosure. In particular, the illustrations in the figures are not necessarily drawn to scale.

What is claimed is:

1. A system for monitoring communications, comprising:
   a database comprising a plurality of operator profiles, a plurality of user profiles, a plurality of sets of monitoring instructions, and a plurality of triggers received from one or more operator interfaces;
   one or more agent servers, each of the agent servers adapted to:
   deploy a plurality of automated agents, each of the automated agents adapted to receive a selected one of the sets of monitoring instructions and a selected one of the user profiles;
   monitor events on a communication service comprising text-based communications inputted by each of a plurality of users using respective interfaces different from the one or more operator interfaces;
   identify geographic location information for each of the plurality of users of the monitored communication service;
   collect event data from the communications service in a native communications protocol of the communications service, the event data indicative of the text-based communications inputted by the plurality of users; and
   translate the event data from the native communications protocol to a unified communications protocol;
   wherein the plurality of users comprise a user associated with the selected one of the user profiles and the plurality of users each being unaware of the monitoring, the communications service is identified by the selected monitoring instructions; and
   a central server comprising one or more processors, the central server adapted to:
   receive, using the unified communications protocol, the event data collected by each of the automated agents,
   store the received event data in the database in association with the identified geographic location information,
   determine one or more words of the translated event data satisfy selected ones of the plurality of triggers;
   generate alerts resulting from the satisfied triggers; and
   for each of the operator interfaces, in response to a selection of a geographic area and hidden from the plurality of users:
   determine one or more monitored communications services assigned to the operator interface within the selected geographic area based on the identified geographic location information and according to the operator profiles;
determine selected event data and selected alerts for the assigned monitored communications services; and
transmit the selected event data and the selected alerts to the operator interface.

2. The system of claim 1, wherein the central server is further adapted to:
transmit the operator profiles, the user profiles, and the sets of monitoring instructions to the agent servers using a Hypertext Transfer Protocol; and
transmit the selected event data and the selected alerts to the operator interface using a Hypertext Transfer Protocol.

3. The system of claim 1, wherein each of the agent servers are further adapted to receive a plurality of triggers, to determine selected ones of the triggers satisfied by the collected event data, to generate alerts resulting from selected ones of the triggers satisfied by the collected event data, and to transmit the alerts to the central server.

4. The system of claim 1, wherein each of the agent servers are further adapted to receive one or more auto response triggers, to determine selected ones of the auto response triggers satisfied by the collected event data, to generate a responsive event, and to transmit the responsive event to the automated agent that collected the event data that satisfied the auto response trigger.

5. The system of claim 1, wherein the native communications protocol of the communications service is selected from a group consisting of:
Internet Relay Chat;
OSCAR protocol;
Microsoft Notification Protocol;
rendezvous protocol;
Yahoo! Messenger Protocol; and
Extensible Messaging and Presence Protocol.

6. The system of claim 1, wherein the unified communications protocol is an XML-based unified communications protocol.

7. The system of claim 1, wherein the agent servers are further operable to determine a plurality of geolocation information of one or more users of the communications services and transmit the geolocation information to the central server; and wherein the central server is further adapted to receive, using the unified communications protocol, the geolocation information collected by each of the agent servers, to store the received geolocation information in the database, and, for each of a plurality of operator interfaces, to determine selected geolocation information for the communications services assigned to the operator interface, and to transmit the selected geolocation information to the operator interface.

8. The system of claim 1, wherein the central server transmits the selected event data and the selected alerts to the operator interface in or near real-time.

9. The system of claim 1, wherein the selection of the geographic area comprises clicking and dragging an area of a map displayed on an operator interface and the selected event data and the selected alerts for the assigned eavesdropped communications services are displayed in association with the displayed map.

10. A method for monitoring communications comprising:
maintaining in a database a plurality of operator profiles, a plurality of user profiles, a plurality of sets of monitoring instructions, and a plurality of triggers received from one or more operator interfaces;
receiving a plurality of user profiles and a plurality of sets of monitoring instructions from a central server;
deploying a plurality of automated agents, each of the automated agents adapted to:
receive a selected one of the sets of monitoring instructions and a selected one of the user profiles;
monitor events on a communication service comprising text-based communications inputted by each of a plurality of users using respective interfaces different from the one or more operator interfaces, the plurality of users comprising a user associated with the selected one of the user profiles, the plurality of users each being unaware of the monitoring by the automated agent, the communications service identified by the monitoring instructions;
identify geographic location information for each of the plurality of users of the monitored communication service;
collect event data indicative of the text-based communications inputted by the plurality of users, the data collected in a native communications protocol of the communications service;
translate the event data from the native communications protocol to a unified communications protocol; and
transmit the translated event data to the central server;
receiving translated event data from an agent server using a unified communications protocol;
storing the received event data in the database in association with the identified geographic location information;
determining that one or more words of the translated event data satisfy selected ones of the plurality of triggers;
generating alerts resulting from the satisfied triggers; and
for each of the operator interfaces, in response to a selection of a geographic area and hidden from the plurality of users:
identifying one or more monitored communications services assigned to the operator interface within the selected geographic area based on the identified geographic location information and according to the operator profiles;
identifying selected event data and selected alerts for the assigned monitored communications services; and
transmitting the selected event data and the selected alerts to the operator interface.

11. The method of claim 10, further comprising:
transmitting the operator profiles, the user profiles, and the sets of monitoring instructions to the agent servers using a Hypertext Transfer Protocol; and
transmitting the selected event data and the selected alerts to the operator interface using a Hypertext Transfer Protocol.

12. The method of claim 10, wherein each of the agent servers are further adapted to receive a plurality of triggers, to determine selected ones of the triggers satisfied by the collected event data, to generate alerts resulting from selected ones of the triggers satisfied by the collected event data, and to transmit the alerts to the central server.

13. The method of claim 10, wherein each of the agent servers are further adapted to receive one or more auto response triggers, to determine selected ones of the auto response triggers satisfied by the collected event data, to generate a responsive event, and to transmit the responsive event to the automated agent that collected the event data that satisfied the auto response trigger.

14. The method of claim 10, wherein the native communications protocol of the communications service is selected from a group consisting of:

Internet Relay Chat;
OSCAR protocol;
Microsoft Notification Protocol;
rendezvous protocol;
Yahoo! Messenger Protocol; and
Extensible Messaging and Presence Protocol.

15. The method of claim 10, wherein the unified communications protocol is an XML-based unified communications protocol.

16. The method of claim 10, further comprising:
   determining a plurality of geolocation information of one or more users of the communications services;
   transmitting the geolocation information to the central server;
   receiving, using the unified communications protocol, the geolocation information collected by each of the agent servers;
   storing the received geolocation information in the database;
   determining for each of a plurality of operator interfaces selected geolocation information for the communications services assigned to the operator interface; and
   transmitting the selected geolocation information to the operator interface.

17. The method of claim 10, further comprising transmitting the selected event data and the selected alerts to the operator interface in or near real-time.

18. The method of claim 10, wherein the selection of the geographic area comprises clicking and dragging an area of a map displayed on an operator interface and the selected event data and the selected alerts for the assigned eavesdropped communications services are displayed in association with the displayed map.

19. A computer readable medium comprising software for monitoring communications, the software comprising computer code such that when executed is operable to:
   maintain in a database a plurality of operator profiles, a plurality of user profiles, a plurality of sets of monitoring instructions, and a plurality of triggers received from one or more operator interfaces;
   receive a plurality of user profiles and a plurality of sets of monitoring instructions from a central server;
   deploy a plurality of automated agents, each of the automated agents adapted to:
      receive a selected one of the sets of monitoring instructions and a selected one of the user profiles;
      monitor events on a communication service comprising text-based communications inputted by each of a plurality of users using respective interfaces different from the one or more operator interfaces, the plurality of users comprising a user associated with the selected one of the user profiles, the plurality of users each unaware of the monitoring by the automated agent, the communications service identified by the monitoring instructions;
      identify geographic location information for each of the plurality of users of the monitored communication service;
      collect event data indicative of the text-based communications inputted by the plurality of users, the data collected in a native communications protocol of the communications service;
      translate the event data from the native communications protocol to a unified communications protocol; and
      transmit the translated event data to the central server;
   receive translated event data from an agent server using a unified communications protocol;
   store the received event data in the database in association with the identified geographic location information;
   determine that one or more words of the translated event data satisfy selected ones of the plurality of triggers;
   generate alerts resulting from the satisfied triggers;
   for each of the operator interfaces, in response to a selection of a geographic area and hidden from the plurality of users;
      identify one or more monitored communications services assigned to the operator interfaces interface within the selected geographic area based on the identified geographic location information and according to the operator profiles;
      identify selected event data and selected alerts for the assigned communications monitored services; and
      transmit the selected event data and the selected alerts to the operator interface.

20. The computer readable medium of claim 19, wherein the computer code when executed is further operable to:
   transmit the operator profiles, the user profiles, and the sets of monitoring instructions to the agent servers using a Hypertext Transfer Protocol; and
   transmit the selected event data and the selected alerts to the operator interface using a Hypertext Transfer Protocol.

21. The computer readable medium of claim 19, wherein the computer code when executed is further operable to:
   receive one or more auto response triggers;
   determine selected ones of the auto response triggers satisfied by the collected event data;
   generate a responsive event; and
   transmit the responsive event to the automated agent that collected the event data that satisfied the auto response trigger.

22. The computer readable medium of claim 19, wherein the computer code when executed is further operable to:
   determine a plurality of geolocation information of one or more users of the communications services;
   transmit the geolocation information to the central server;
   receive, using the unified communications protocol, the geolocation information collected by each of the agent servers;
   store the received geolocation information in the database;
   determine for each of a plurality of operator interfaces selected geolocation information for the communications services assigned to the operator interface; and
   transmit the selected geolocation information to the operator interface.

23. The computer readable medium of claim 19, wherein the selection of the geographic area comprises clicking and dragging an area of a map displayed on an operator interface and the selected event data and the selected alerts for the assigned eavesdropped communications services are displayed in association with the displayed map.

* * * * *